(12) United States Patent
Yoo

(10) Patent No.: US 8,690,049 B2
(45) Date of Patent: Apr. 8, 2014

(54) METHOD FOR GENERATING AN IMAGE FILE FOR FORGERY VERIFICATION AND A METHOD FOR FORGERYVERIFICATION OF AN IMAGE FILE

(75) Inventor: Chang Hun Yoo, Seoul (KR)

(73) Assignee: Digitalzone Co., Ltd., Seoul (KR)

( * ) Notice: Subject to any disclaimer, the term of this patent is extended or adjusted under 35 U.S.C. 154(b) by 160 days.

(21) Appl. No.: 13/321,846

(22) PCT Filed: Apr. 1, 2010

(86) PCT No.: PCT/KR2010/002023
§ 371 (c)(1),
(2), (4) Date: Dec. 14, 2011

(87) PCT Pub. No.: WO2010/134692
PCT Pub. Date: Nov. 25, 2010

(65) Prior Publication Data
US 2012/0074215 A1    Mar. 29, 2012

(30) Foreign Application Priority Data
May 22, 2009 (KR) ........................ 10-2009-0044940

(51) Int. Cl.
G06F 11/00 (2006.01)
G06F 17/00 (2006.01)
G06F 17/30 (2006.01)
G06K 7/10 (2006.01)
G06K 19/00 (2006.01)
G06K 15/00 (2006.01)

(52) U.S. Cl.
USPC ...... 235/375; 235/462.01; 235/487; 235/494; 382/100; 726/26; 726/32

(58) Field of Classification Search
USPC ............ 235/375, 462.01, 487, 494; 358/1.18; 382/100, 112; 714/100; 726/26, 32
See application file for complete search history.

(56) References Cited

U.S. PATENT DOCUMENTS 6,266,680 B1 * 7/2001 Song et al. .................... 715/206

* cited by examiner

*Primary Examiner* — Michael G Lee
*Assistant Examiner* — Laura Gudorf

(57) ABSTRACT

The present invention is related to a method for generating an image file for forgery verification and a method for forgery verification. A method for generating an image file for forgery verification according to the present invention consists of a generating a bit map of the image file, a generating a horizontal check logic, a vertical check logic, and a check logic of each region from the bit map, a generating a two-dimensional bar code from the horizontal check logic, the vertical check logic, and the check logic of each region, and a generating an image file for forgery verification into which the two-dimensional bar code is inserted. A method for forgery verification according to the present invention consists of a generating a first horizontal check logic, a first vertical check logic, and a first check logic of each region from the bit map by generating a bit map of an image file for forgery verification into which a two-dimensional bar code is inserted, a generating a second horizontal check logic, a second vertical check logic, and a second check logic of each region from the two-dimensional bar code, and a comparing the first and the second horizontal check logics, the first and the second vertical check logics, and the first and the second check logics of each region.

18 Claims, 4 Drawing Sheets

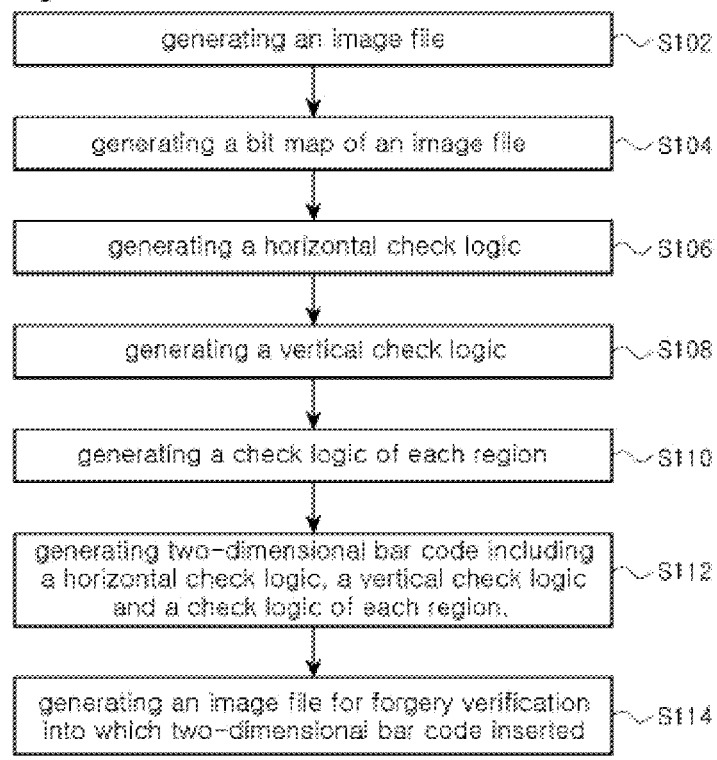
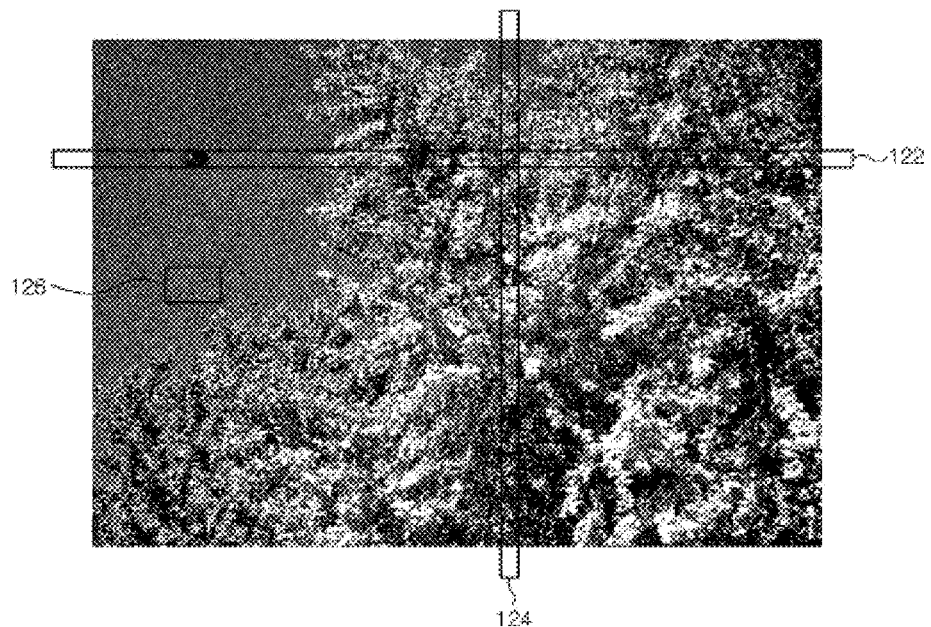

METHOD FOR GENERATING AN IMAGE FILE FOR FORGERY VERIFICATION AND A METHOD FOR FORGERY VERIFICATION OF AN IMAGE FILE

TECHNICAL FIELD

The present invention is related to a method for generating an image file for forgery verification and a method for forgery verification of an image file for judging whether an image file generated by a digital camera, a scanner and the like is forged or not.

BACKGROUND ART

Recently, many image files are being generated by a digital camera, a scanner and etc. and they are widely distributed via Internet. However, a slew of images are corrected by an image editing program such as a photo shop, and a problem was generated that it is not possible to distinguish whether a digitized image file is an original one which is initially generated in an actual device or a corrected file.

In the past, in case of an electronic document, there was an system, wherein the code values of the characters described in the document are embedded into two-dimensional bar codes, and then distributed, and forgery of a document can be verified by comparing the code values of the characters of the distributed document and the two-dimensional bar codes.

But, in case of an image file, since the size of data became large when embedding all pixel information into a two-dimensional bar code, it is impossible to do so. For example, a digital camera which is used very frequently recently has approximately 5 million pixels, but the data amount including RGB color value becomes approximately 15 mega bites. Therefore, there is a shortcoming that even two-dimensional bar code which can contain tremendous amount of data can not contain all pixel information of an image file.

DISCLOSURE OF INVENTION

Technical Problem

In order to solve the above-mentioned problems, the present invention is devised and the object of the present invention is to provide a method for generating an image file for forgery verification, and a method for forgery verification for judging whether an image file generated by a digital camera, a scanner and the like is forged or not.

Further, the present invention is related to a method for generating an image file for forgery verification, and a method for forgery verification for finding the portions where an image file generated by a digital camera, a scanner and the like is forged.

Solution to Problem

A method for generating an image file for forgery verification according to the present invention for achieving the above objects consists of a generating a bit map of the image file; a generating a horizontal check logic, a vertical check logic, and a check logic of each region from the bit map; a generating a two-dimensional bar code from the horizontal check logic, the vertical check logic, and the check logic of each region; and a generating an image file for forgery verification into which the two-dimensional bar code is inserted.

A method for forgery verification of an image file according to the present invention for achieving the above objects consists of a generating a first horizontal check logic, a first vertical check logic, and a first check logic of each region from the bit map by generating a bit map of an image file for forgery verification into which a two-dimensional bar code is inserted; a generating a second horizontal check logic, a second vertical check logic, and a second check logic of each region from the two-dimensional bar code; and a comparing the first and the second horizontal check logics, the first and the second vertical check logics, and the first and the second check logics of each region.

A method for forgery verification of other image files according to the present invention for achieving the above objects consists of a generating a first horizontal check logic, a first vertical check logic, and a first check logic of each region from the two-dimensional bar code of an image file for forgery verification into which the two-dimensional bar code is inserted; a generating a bit map of an image file for forgery verification and for generating a second horizontal check logic, a second vertical check logic, and a second check logic of each region from the bit map; and a comparing the first and the second horizontal check logics, the first and the second vertical check logics, and the first and the second check logics of each region.

BRIEF DESCRIPTION OF DRAWINGS

The above and other aspects, features and advantages of the present invention will be more apparent from the following detailed description taken in conjunction with the accompanying drawings, in which:

FIG. 1 is a flow chart illustrating a method for generating an image file for forgery verification according to the present invention.

FIG. 2 is a diagram illustrating an embodiment of a method for generating an image file for forgery verification according to the present invention.

BEST MODE FOR CARRYING OUT THE INVENTION

Below, a method for generating an image file for forgery verification according to the present invention is explained in detail with referring to the attached drawings.

Figure 3:
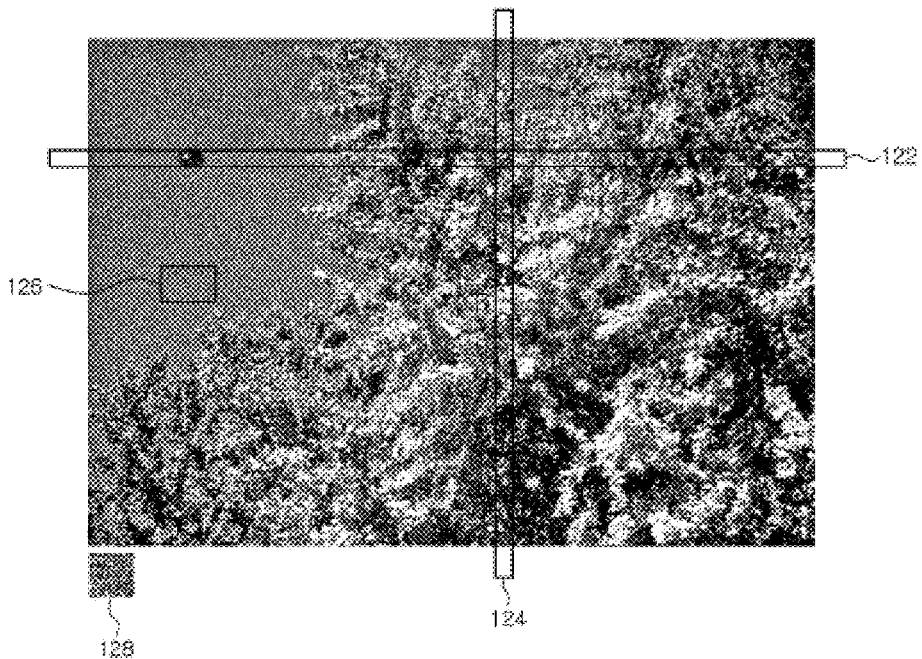
FIG. 3 is a diagram illustrating an image file for forgery verification generated according to the method for generating the image file for forgery verification according to the present invention.

FIG. 1 is a flow chart illustrating a method for generating an image file for forgery verification according to the present invention. FIG. 2 is a diagram illustrating an embodiment of a method for generating an image file for forgery verification according to the present invention. FIG. 3 is a diagram illustrating an image file for forgery verification generated according to the method for generating the image file for forgery verification according to the present invention.

A two-dimensional bar code is inserted for judging forgery of an image file according to the method for generating an image file for forgery verification according to an embodiment of the present invention.

First of all, if a photo is taken by a digital camera, an image file is generated(S102).

A bit map is generated by using the generated image file (S104).

A bit map is one type of an image file format or a memory storage method which is used for storing a digital image in a computer field, and it is generally called as a raster graphics(a dot method). That is, the bit map is a method for displaying each dot on a screen as a pixel unit by using a rectangular coordinates. If a picture is expanded, each dot is getting larger and a staircase phenomenon that a boundary region is observed as a lumpy surface appears. Thus, the algorithms(a bicubic filtering, a double linear filtering and etc.) for processing this phenomenon more smoothly are widely known.

Next, a horizontal check logic 122 is generated from a bit map as illustrated in FIG. 2(S106).

A hash code is obtained as an output value by using a hash function while designating values of horizontal coordinates of the bit map as an input value. The output values of each horizontal coordinate obtained in such a manner are set as the horizontal check logics.

A hash function is a function for converting a given input into a fixed short output, and is called as an one-way function. That is, it does not have any inverse functions and the hash function must meet all the requirements that ① it is impossible to compute an input value for a given output (one-way orientation), ② it is impossible to find another input having same output for a given input by computation, and ③ it is impossible to find two different input messages having same outputs by computation (strong collision avoidance).

Such a hash function is one of the important functions applied in a data integrity, authentication, a denial prevention field and etc. For example, in case of an electronic signature, various sizes of messages ranging from several bites to a few giga bites are compressed into a hash code and an electronic signature value is generated by using the hash code. At this time, if another message generates the same hash code, the above electronic signature value becomes a signature for another message. Therefore, a big problem may be generated, but actually, such a problem will not occur. A reason of it is that it is impossible to find a pair of messages having the same hash code since a hash function has a strong collision avoidance.

As a typical hash function, SHA-1 was developed in 1995 by correcting and complementing SHA that NSA designed in 1993, and has been selected as the USA standard. Now, it is recommended that a hash function having above 160 bit be employed for a collision avoidance. Further, HAS-160 was developed as a domestic standard hash function. It has an output length of 160 bit like SHA-1, and is applied to a domestic standard signature algorithm, KCDSA.

Subsequently, a vertical check logic 124 is generated from the generated bit map(S108).

A hash code is obtained as an output value by using a hash function while designating values of vertical coordinates of the bit map as an input value. The output values of each vertical coordinate obtained in such a manner are set as the vertical check logics.

Thereafter, a check logic 126 of each region is generated from the generated bit map(S110).

A hash code is obtained as an output value by using a hash function while dividing the bit map into constant regions and designating values of horizontal and vertical coordinates of the regions as an input value. The output values of each horizontal and vertical coordinate of each region obtained in such a manner are set as the check logics of each region.

At this time, in dividing the bit map into constant regions, it is preferable to divide the bit map into a rectangular shape. But, it is possible to divide it into a circle shape, a diamond type, a triangular shape and the like according to the situations according to the situations, and the diverse kinds of sizes can also be set.

According to an embodiment of the present invention, the values of a horizontal check logic 122, a vertical check logic 124, and a check logic 126 of each region are generated according to this order, but this is only a simple example and thus, it is possible change the generation order. That is, it is possible generate a vertical check logic 124, and then to generate a horizontal check logic 122 and a check logic 126 of each region.

Next, a two-dimensional bar code 128 including a horizontal check logic 122, a vertical check logic 124, and a check logic 126 of each region is generated as illustrated in FIG. 3(S112).

Such a two-dimensional bar code 128 is a braille, mosaic type code formed as a plane surface by arranging information in both directions X, Y and is developed for complementing limitation of an information representation of an one-dimensional bar code. It can store information above approximately 100 times of one-dimensional bar code. At this time, it is possible to enable various kinds of information to be contained into the bar code, and thereby to grasp concerned information without operating together with a database. Further, it is also possible to store various kinds of information such as graphs, photos, voices, fingerprints and signatures as well as a text such as characters, numbers and the like in a small square shape.

Now, four bar code types such as QR-Code, PDF417, Data Matrix, Maxi Code are recognized as the standard types.

An image file for forgery verification is generated by inserting the generated two-dimensional bar code 128 into a lower left side(S114). At this time, the two-dimensional bar code 128 cab be inserted into various positions such as a lower right side, a upper left side and the like.

An image file for forgery verification into which the two-dimensional bar code 128 generated in such a manner is inserted is stored in a memory of a digital camera.

In the embodiment of the present invention, a method for generating an image file for forgery verification is explained by taking a photo taken by a digital camera as an example, but the method for generating an image file for forgery verification according to the present invention is not limited to this embodiment and the method of the present invention can be applied to diverse kinds of image files such as an image file generated by scanning, and an image file generated by a computer program which can draw pictures such as a painter, a photoshop and a picture board.

Therefore, in case of the photo taken by a digital camera, a two-dimensional bar code related to the photo is generated and then inserted at the same time when taking the picture. In case of the image file generated by scanning, a two-dimensional bar code related to the image file is generated and then inserted at the same time when scanning. In case of the image file generated by a computer program, a two-dimensional bar code related to the image file is generated and then inserted at the same time when pushing a storage button.

Such a two-dimensional bar code has a unique information code of the image file, and forgery verification of an image file into which a two-dimensional bar code is inserted can be executed since it is impossible to forge a two-dimensional bar code itself.

Such an image file for forgery verification is distributed via Internet, and other EDMS(an electronic document management system). At this time, a wicked person can download an image file for forgery verification via Internet, falsify it, and then upload the forged file during a distribution process. As a result, the forged image file can be distributed.

For example, if the UFO photo taken by the digital camera in FIG. 2 and FIG. 3 is distributed through Internet, there will be a serious dispute concerning whether this photo is an original one or is distributed as a forged one. Therefore, a method for verifying whether a distributed image file is an original one or not is required.

Below, the first embodiment of forgery verification of an image file according to the present invention will be explained in detail with referring to the attached drawings.

Figure 4:
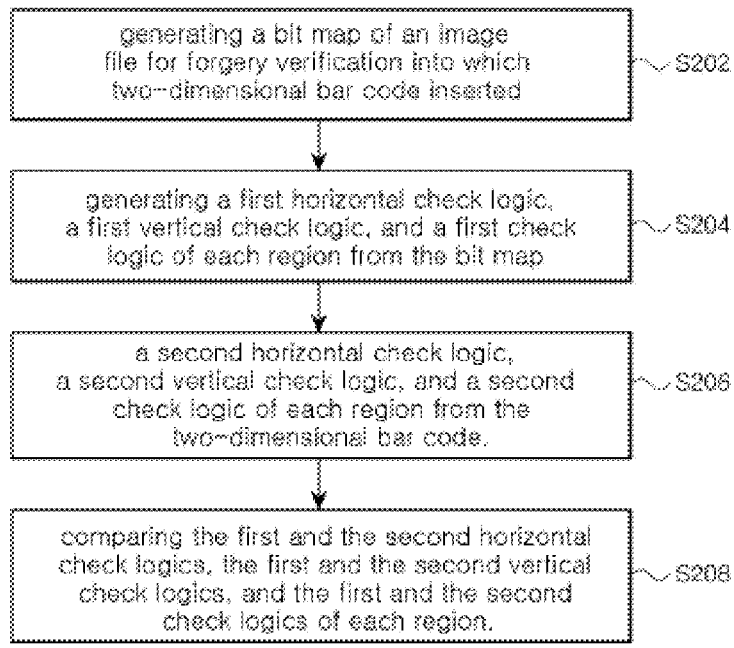
FIG. 4 is a flowchart illustrating a method for forgery verification of an image file according to the present invention.
Figure 5:
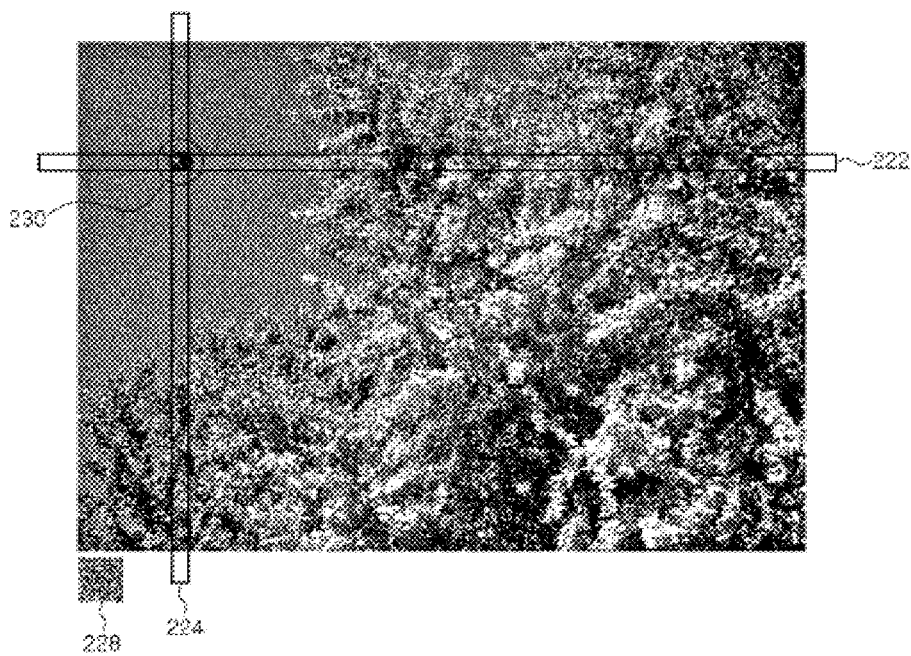
FIG. 5 is a diagram illustrating the first embodiment of a method for forgery verification of an image file according to the present invention.

FIG. 4 is a flowchart illustrating a method for forgery verification of an image file according to the present invention, and FIG. 5 is a diagram illustrating the first embodiment of a method for forgery verification of an image file according to the present invention.

First of all, a bit map is generated by using an image file for forgery verification into which two-dimensional bar code 228 generated according to the method for generating an image file for forgery verification according to an embodiment of the present invention is inserted(S202).

Next, a first horizontal check logic 222, a first vertical check logic 224, and a first check logic of each region are generated from the generated bit map(S204).

The horizontal and the vertical coordinates of the bit map are designated as an input value, and the bit map is divided into constant regions and then the horizontal and the vertical coordinate values of each region are designated as an input value. Then, a hash code is obtained as an output value by using a hash function. The output values of each horizontal coordinate of each region obtained in such a manner are set as the first horizontal check logic 222, the output values of each vertical coordinate are set as the first vertical check logic 224, and the output values of the horizontal and the vertical coordinate of each region are set as the first check logic of each region.

At this time, in dividing the bit map into constant regions, it is preferable to divide the bit map into a rectangular shape. But, it is possible to divide it into a circle shape, a diamond type, a triangular shape and the like according to the situations according to the situations, and the diverse kinds of sizes can also be set.

Further, the order for acquiring the first horizontal check logic 222, the first vertical check logic 224, and the first check logic of each region can be changed according to various kinds of ways.

Next, a second horizontal check logic, a second vertical check logic, and a second check logic of each region are generated from the two-dimensional bar code 228 inserted into an image file for forgery verification(S206).

The second horizontal check logic, the second vertical check logic, and the second check logic of each region can be obtained from information stored in the two-dimensional bar code 228 inserted into an image file for forgery verification.

The information stored in the two-dimensional bar code 228 is an integral information of an image file for forgery verification, and it is impossible to forge a two-dimensional bar code itself Now, four bar code types such as QR-Code, PDF417, Data Matrix, Maxi Code are recognized as the standard types in Korea.

Next, the first horizontal check logic 222 and the second horizontal check logic, the first vertical check logic 224 and the second vertical check logic, and the first check logic of each region and the second check logic of each region are compared(S208).

At this time, if the first horizontal check logic 222 coincides with the second horizontal check logic, the first vertical check logic 224 coincides with the second vertical check logic, and the first check logic of each region coincides with the second check logic of each region, an image file for forgery verification is recognized as an original one and it can be confirmed as an image file which is not forged.

However, if the first horizontal check logic 222 does not coincide with the second horizontal check logic, the first vertical check logic 224 does not coincide with the second vertical check logic, and the first check logic of each region does not coincide with the second check logic of each region, an image file for forgery verification is determined as an a forged image file.

At this time, as illustrated in FIG. 5, if there is one point where a portion where the first horizontal check logic 222 does not coincide with the second horizontal check logic intersects with a portion where the first vertical check logic 224 does not coincide with the second vertical check logic, the intersecting point is determined as a forged region 230.

Therefore, it can be understood that UFO positioned at the point determined as the forged region 230 is an image fabricated by someone during distribution of an image file for forgery verification.

In the first embodiment of a method for forgery verification of an image file according to the present invention, we reviewed a case where one forged region exists, but in the second embodiment, a method for finding existence of forgery and a forged region will be examined for a case where a plurality of forged regions exist.

Below, the second embodiment of forgery verification of an image file according to the present invention will be explained in detail with referring to the attached drawings.

Figure 6:
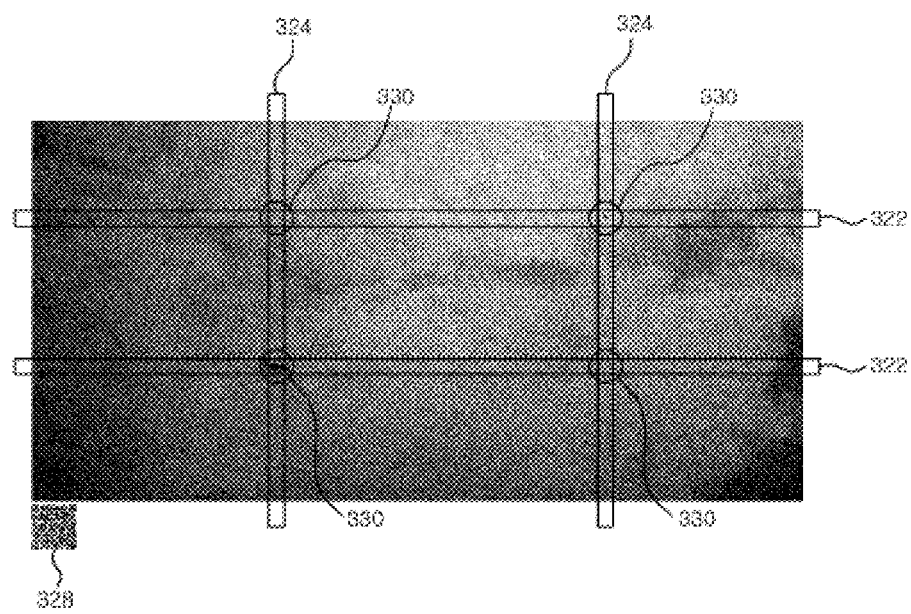
FIG. 6 and FIG. 7 are the diagrams illustrating the second embodiment of a method for forgery verification of an image file according to the present invention.
Figure 7:
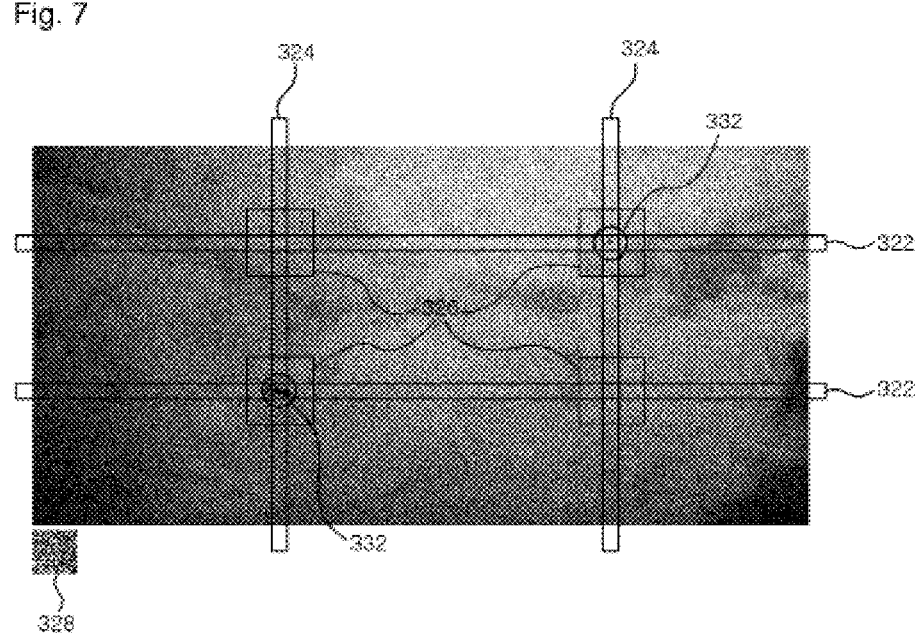

FIG. 6 and FIG. 7 are diagrams illustrating the second embodiment of a method for forgery verification of an image file according to the present invention.

First of all, a bit map is generated by using an image file for forgery verification into which two-dimensional bar code 328 generated according to the method for generating an image file for forgery verification according to an embodiment of the present invention is inserted.

Subsequently, a first horizontal check logic 322, a first vertical check logic 324, and a first check logic 326 of each region are generated from the generated bit map.

The horizontal and the vertical coordinates of the bit map are designated as an input value, and the bit map is divided into constant regions and then the horizontal and the vertical coordinate values of each region are designated as an input value. Then, a hash code is obtained as an output value by using a hash function. The output values of each horizontal coordinate of each region obtained in such a manner are set as the first horizontal check logic 322, the output values of each vertical coordinate are set as the first vertical check logic 324, and the output values of the horizontal and the vertical coordinate of each region are set as the first check logic 326 of each region.

At this time, in dividing the bit map into constant regions, it is preferable to divide the bit map into a rectangular shape. But, it is possible to divide it into a circle shape, a diamond type, a triangular shape and the like according to the situations according to the situations, and the diverse kinds of sizes can also be set.

Further, the order for acquiring the first horizontal check logic 222, the first vertical check logic 224, and the first check logic of each region can be changed according to various kinds of ways.

Next, a second horizontal check logic, a second vertical check logic, and a second check logic of each region are generated from the two-dimensional bar code 328 inserted into an image file for forgery verification.

The second horizontal check logic, the second vertical check logic, and the second check logic of each region can be obtained from information stored in the two-dimensional bar code 328 inserted into an image file for forgery verification.

The information stored in the two-dimensional bar code 228 is an integral information of an image file for forgery verification, and it is impossible to forge a two-dimensional bar code itself. Now, four bar code types such as QR-Code, PDF417, Data Matrix, Maxi Code are recognized as the standard types in Korea.

Next, the first horizontal check logic 322 and the second horizontal check logic, the first vertical check logic 324 and the second vertical check logic, and the first check logic 326 of each region and the second check logic of each region are compared mutually.

At this time, if the first horizontal check logic 322 coincides with the second horizontal check logic, the first vertical check logic 324 coincides with the second vertical check logic, and the first check logic 326 of each region coincides with the second check logic of each region, an image file for forgery verification is recognized as an original one and it can be confirmed as an image file which is not forged.

However, if the first horizontal check logic 322 does not coincide with the second horizontal check logic, the first vertical check logic 324 does not coincide with the second vertical check logic, and the first check logic 326 of each region does not coincide with the second check logic of each region, an image file for forgery verification is determined as an a forged image file.

At this time, as illustrated in FIG. 6, if there are four points where a portion where the first horizontal check logic 322 does not coincide with the second horizontal check logic intersects with a portion where the first vertical check logic 324 does not coincide with the second vertical check logic, the intersecting points are selected as a forged region candidate 330.

As illustrated in FIG. 7, the first check logic 326 of each region is compared with the second check logic of each region among four intersecting points. As a result of it, two coincident points are determined as the regions which are not forged, and two points where first check logic 326 of each region does not coincide with the second check logic of each region are determined as the forged region 332.

Therefore, it can be understood that UFO on two points determined as the forged region 332 is an image fabricated by someone during distribution of an image file for forgery verification.

In the first and the second embodiments of a method for forgery verification of an image file according to the present invention, a first horizontal check logic, a first vertical check logic, and a first check logic of each region are generated from an image file for forgery verification into which two-dimensional bar code is inserted. Then, a second horizontal check logic, a second vertical check logic, and a second check logic of each region are generated from two-dimensional bar code.

However, according to a method for forgery verification of an image file according to the present invention is not limited to the above procedure, it is possible to generate a second horizontal check logic, a second vertical check logic, and a second check logic of each region from a bit map generated from an image file for forgery verification into which two-dimensional bar code is inserted after generating a first horizontal check logic, a first vertical check logic, and a first check logic of each region from two-dimensional bar code of an image file for forgery verification into which two-dimensional bar code is inserted, Further, according to a method for forgery verification of an image file according to the present invention, there are various kinds of image files such as a photo taken by a digital camera, an image file generated by scanning, and an image file generated by a computer program which can draw pictures such as a painter, a photoshop and a picture board.

In the above description, the embodiments of the present invention are explained, but the present invention is not limited to these embodiments and it is understood that the inventions which can be changed and modified by a person having a common knowledge in the technological field pertaining to the present invention belong to the scope of the present invention.

INDUSTRIAL APPLICABILITY

A method for generating an image file for forgery verification and a method for forgery verification of an image file as disclosed in the foregoing descriptions has following effects.

Firstly, it is possible to judge whether an image file generated by a digital camera, a scanner and the like is forged or not by using a method for generating an image file for forgery verification and a method for forgery verification of an image file according to the present invention.

Secondly, it is possible to find the forged portions of an image file generated by a digital camera, a scanner and the like by using a method for generating an image file for forgery verification and a method for forgery verification of an image file.

I claim:

1. A method for generating an image file for forgery verification comprising:
generating a bit map of the image file;
dividing the bit map into constant regions;
generating a horizontal check logic, a vertical check logic, and a check logic of each region of the constant regions from the bit map;
generating a two-dimensional bar code from the horizontal check logic, the vertical check logic, and the check logic of the each region; and
generating an image file for forgery verification into which the two-dimensional bar code is inserted.

2. The method for generating an image file for forgery verification according to the claim 1, wherein the generating a horizontal check logic, a vertical check logic, and a check logic of the each region from the bit map generates
an output value obtained by using a hash function is set as the horizontal check logic while designating values of horizontal coordinates of the bit map as an input value,
an output value obtained by using a hash function is set as the vertical check logic while designating values of vertical coordinates of the bit map as an input value, and
an output value obtained by using a hash function is set as the check logic of each region while dividing the bit map into constant regions and designating values of horizontal and vertical coordinates of the regions as an input value.

3. The method for generating an image file for forgery verification according to the claim 1, wherein the image file is any one of a photo taken by a digital camera, an image file generated by scanning and an image file by a computer program.

4. The method for generating an image file for forgery verification according to the claim 3, wherein if the image file is the photo taken by the digital camera, the two-dimensional bar code is generated at the same time when taking the photo, and is inserted into the image file for forgery verification.

5. The method for generating an image file for forgery verification according to the claim 3, wherein if the image file is the image file generated by scanning, the two-dimensional bar code is generated at the same time when scanning is performed, and is inserted into the image file for forgery verification.

6. A method for generating an image file for forgery verification according to the claim 3, wherein if the image file is the image file generated by the computer program, the two-dimensional bar code is generated at the same time when a storage button is pushed, and is inserted into the image file for forgery verification.

7. A method for forgery verification of an image file comprising:
generating a bit map of an image file for forgery verification into which a two-dimensional bar code is inserted;
dividing the bit map into constant regions;
generating a first horizontal check logic, a first vertical check logic, and a first check logic of each region of the constant regions from the bit map;
generating a second horizontal check logic, a second vertical check logic, and a second check logic of the each region from the two-dimensional bar code; and
comparing the first and the second horizontal check logics, the first and the second vertical check logics, and the first and the second check logics of the each region.

8. The method for forgery verification of an image file according to the claim 7, wherein the generating the first horizontal check logic, the first vertical check logic, and the first check logic of the each region from the bit map generates
an output value obtained by using a hash function is set as the first horizontal check logic while designating values of horizontal coordinates of the bit map as an input value,
an output value obtained by using a hash function is set as the first vertical check logic while designating values of vertical coordinates of the bit map as an input value, and
an output value obtained by using a hash function is set as the first check logic of each region while dividing the bit map into constant regions and designating values of horizontal and vertical coordinates of the regions as an input value.

9. A method for forgery verification of an image file comprising:
generating a bit map of an image file for forgery verification into which a two-dimensional bar code is inserted;
dividing the bit map into constant regions;
generating a first horizontal check logic, a first vertical check logic, and a first check logic of each region of the constant regions from the two-dimensional bar code of the image file for forgery verification;
generating a bit map of an image file for forgery verification and for generating a second horizontal check logic, a second vertical check logic, and a second check logic of the each region from the bit map; and
comparing the first and the second horizontal check logics, the first and the second vertical check logics, and the first and the second check logics of the each region.

10. The method for forgery verification of an image file according to the claim 9, wherein the generating the second horizontal check logic, the second vertical check logic, and the second check logic of each region from the bit map generates
an output value obtained by using a hash function is set as the second horizontal check logic while designating values of horizontal coordinates of the bit map as an input value,
an output value obtained by using a hash function is set as the second vertical check logic while designating values of vertical coordinates of the bit map as an input value, and
an output value obtained by using a hash function is set as the second check logic of each region while dividing the bit map into constant regions and designating values of horizontal and vertical coordinates of the regions as an input value.

11. The method for forgery verification of an image file according to the claim 7, wherein the image file is verified as an image file which is not forged if the first horizontal check logic coincides with the second horizontal check logic, the first vertical check logic coincides with the second vertical check logic, and the first check logic of each region coincides with the second check logic of each region.

12. The method for forgery verification of an image file according to the claim 7, wherein the image file is verified as a forged image file if the first horizontal check logic does not coincide with the second horizontal check logic, the first vertical check logic does not coincide with the second vertical check logic, and the first check logic of each region does not coincide with the second check logic of each region.

13. The method for forgery verification of an image file according to the claim 7, wherein an intersecting point is determined as a forged region if there is the intersecting one point where a portion where the first horizontal check logic does not coincide with the second horizontal check logic intersects with a portion where the first vertical check logic does not coincide with the second vertical check logic.

14. The method for forgery verification of an image file according to the claim 7, wherein if there are many intersecting points where a portion where the first horizontal check logic does not coincide with the second horizontal check logic intersects with a portion where the first vertical check logic does not coincide with the second vertical check logic, a portion where the first check logic of each region does not coincide with the second check logic of each region among the intersecting points is determined as a forged region.

15. The method for forgery verification of an image file according to the claim 9, wherein the image file is verified as an image file which is not forged if the first horizontal check logic coincides with the second horizontal check logic, the first vertical check logic coincides with the second vertical check logic, and the first check logic of each region coincides with the second check logic of each region.

16. The method for forgery verification of an image file according to the claim 9, wherein the image file is verified as a forged image file if the first horizontal check logic does not coincide with the second horizontal check logic, the first vertical check logic does not coincide with the second vertical check logic, and the first check logic of each region does not coincide with the second check logic of each region.

17. The method for forgery verification of an image file according to the claim 9, wherein an intersecting point is determined as a forged region if there is the intersecting one point where a portion where the first horizontal check logic does not coincide with the second horizontal check logic intersects with a portion where the first vertical check logic does not coincide with the second vertical check logic.

18. The method for forgery verification of an image file according to the claim 9, wherein if there are many intersecting points where a portion where the first horizontal check logic does not coincide with the second horizontal check logic intersects with a portion where the first vertical check logic does not coincide with the second vertical check logic, a portion where the first check logic of each region does not coincide with the second check logic of each region among the intersecting points is determined as a forged region.

* * * * *